United States Patent [19]
Yamaguchi et al.

[11] Patent Number: 5,921,782
[45] Date of Patent: Jul. 13, 1999

[54] ASSEMBLY STRUCTURE OF AN AUTOMOTIVE DOOR HARNESS

[75] Inventors: Noboru Yamaguchi; Yasuyoshi Serizawa, both of Shizuoka, Japan

[73] Assignee: Yazaki Corporation, Tokyo, Japan

[21] Appl. No.: 08/887,283

[22] Filed: Jul. 2, 1997

[30] Foreign Application Priority Data

Jul. 5, 1996 [JP] Japan ................................. 8-176689

[51] Int. Cl.⁶ .................................................. H01R 33/00
[52] U.S. Cl. .......................... 439/34; 439/13; 439/367; 174/72 A
[58] Field of Search .................... 439/11, 13, 34, 439/367, 502, 503; 174/72 A; 49/502; 296/146.5, 146.7, 152

[56] References Cited

U.S. PATENT DOCUMENTS

| | | | |
|---|---|---|---|
| 4,862,011 | 8/1989 | Wright | 439/34 X |
| 5,716,044 | 2/1998 | Peterson et al. | 174/72 A |

FOREIGN PATENT DOCUMENTS

| | | | |
|---|---|---|---|
| 2609844 | 7/1988 | France | 439/34 |
| 58-113566 | 8/1983 | Japan | |
| 8-33166 | 2/1996 | Japan | |

Primary Examiner—Khiem Nguyen
Attorney, Agent, or Firm—Armstrong, Westerman, Hattori, McLeland & Naughton

[57] ABSTRACT

The connector of the car body-side wiring harness is rotatably mounted on the door engagement inner wall on the car body. The door harness is inserted through the protector. The protector is provided at one end with the connector of the door harness that mates with the car body-side connector. The other end of the protector is slidably held in the door. The car body-side connector and the door-side connector, coupled together, are both situated between the door-side weather strip and the car body-side weather strip so that when the door is closed, the both connectors are completely concealed from the passenger compartment side. The protector has a pair of vertical slide pins. The slide guide mounted in the door consists of a guide groove that can accommodate the protector, and a pair of horizontal guide slots that can receive the slide pins. The slide guide is fitted in a groove formed in the door inner panel.

11 Claims, 6 Drawing Sheets

FIG. 10
PRIOR ART

ASSEMBLY STRUCTURE OF AN AUTOMOTIVE DOOR HARNESS

BACKGROUND OF THE INVENTION

1. Field of the Invention

The present invention relates to an assembly structure of an automotive door harness, in which a protector through which a door harness is inserted is slidably attached to the door, with a connector of the door harness coupled to a mating connector inside the door engagement inner wall of the car body, to improve the appearance of the protector.

2. Description of the Related Art

Figure 8:
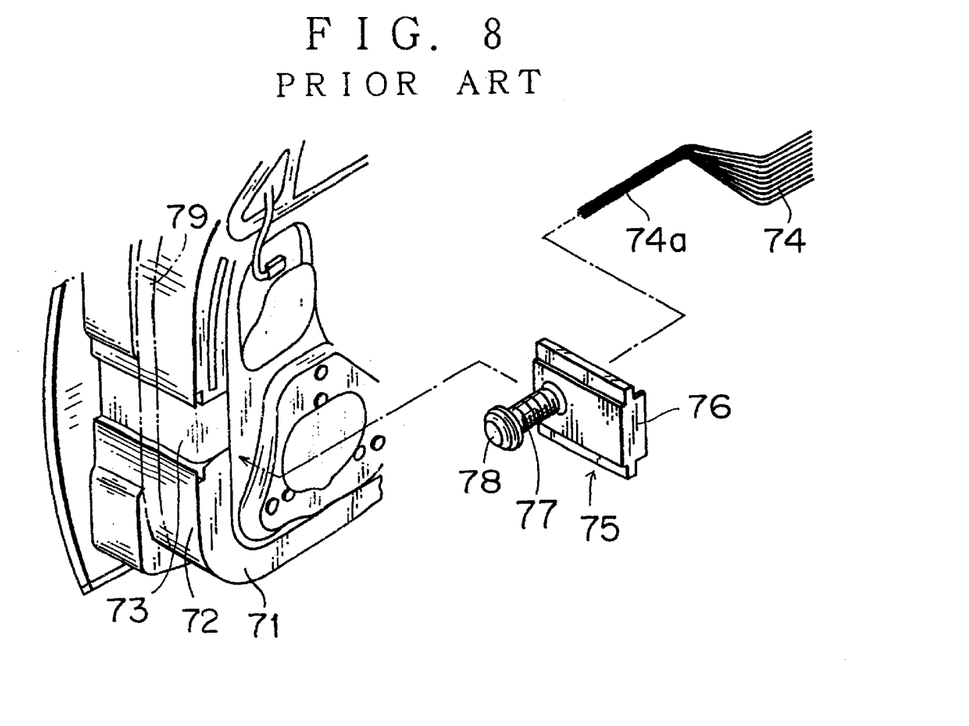
FIG. 8 is an exploded perspective view of a conventional door harness.

FIG. 8 shows an assembly structure of an automotive door harness described in Japanese Patent Application Laid-Open Specification No. Heisei 8-33166.

This structure has a recessed groove 53 at a front end face 52 of a door panel 51 on the hinge mounting side extending in a direction of door thickness. In this recessed groove 53 is laid a wiring harness 54, over which is slid and fitted a base plate portion 56 of a rubber grommet 55, with a front end portion 54a of the wiring harness inserted through a bellows portion 57 of the grommet 55 so that the wiring harness can be led toward the car body side.

The above structure, however, requires troublesome processes of inserting the wiring harness 54 through a hole 58 of the grommet 55 and putting the front end of the bellows portion 57 in place on the car body side. It is also necessary to secure a sealing performance of a weather strip 59 on the base plate portion 56 of the grommet 55.

Figure 9:
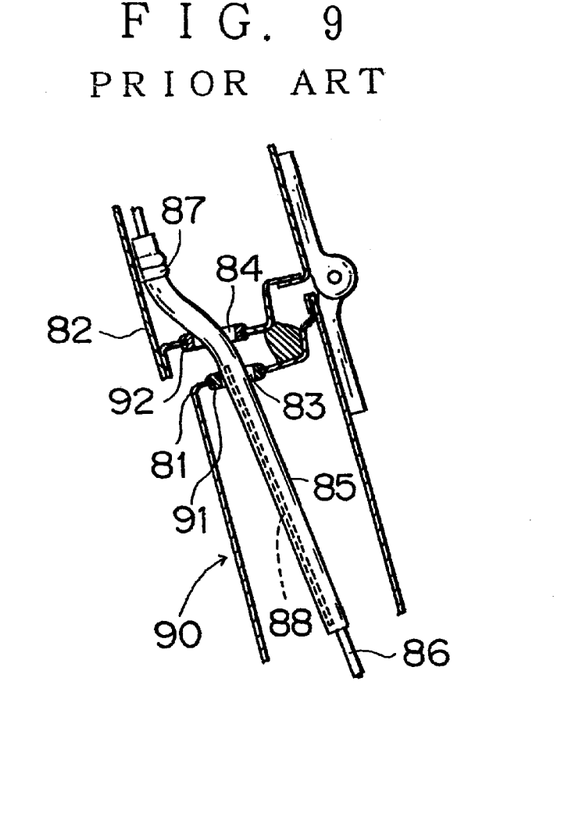
FIG. 9 is a plan view of the conventional door harness when the door is closed.
Figure 10:
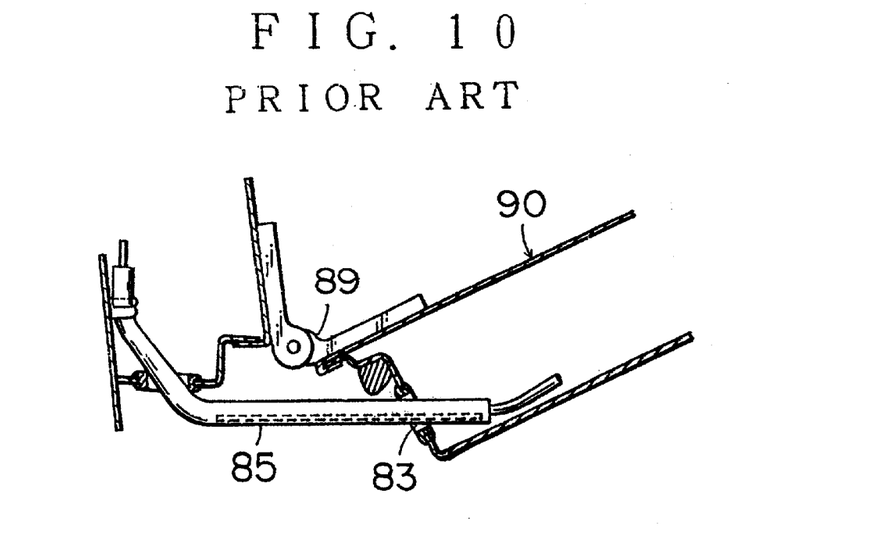
FIG. 10 is a plan view of the conventional door harness when the door is open.

FIG. 9 and 10 show an assembly structure of the automotive door harness described in Japanese Patent Application Laid-Open Specification No. Showa 58-113566.

In this structure, both a door panel 61 and a car body 62 are formed with piercing holes 63, 64, through which is passed a cylindrical elastic protector 65 made of rubber having a wiring harness 66 inserted therethrough, with one end of the elastic protector 65 secured to the car body with a clamp 67 and the other end extending unfixed along the door panel 61. A core material 68 is inserted in a part of the protector 65 on the door side to give it a certain rigidity so that when a door 70 is opened about a hinge 69 as shown in FIG. 10, the protector 65 slides in the piercing hole 63 and bends at an intermediate portion to follow the movement of the door 70.

This structure, however, requires a cumbersome assembly work of inserting the protector 65 through the piercing holes 63, 64. Because the protector 65 on the door side does not bend, the assembly work is not easy. Further, to ensure easy insertion of the protector through the holes and smooth sliding motion of the protector requires large piercing holes, which mars the appearance.

SUMMARY OF THE INVENTION

Under these circumstances, it is an object of the present invention to provide an assembly structure of automotive door harness that eliminates the cumbersome work of inserting the wiring harness through piercing holes in the car body and door panel and through grommets, secures waterproofing performance of the door harness without using the grommets, improves appearance of the protector assembly portion, and ensures smooth sliding motion of the protector.

In order to attain the object, according to an aspect of this invention, there is provided an assembly structure of an automotive door harness comprising: a car body; a door; a car body-side wiring harness having a first connector rotatably mounted on the car body; a door-side wiring harness having a second connector couplable to the first connector of the car body-side wiring harness; and a protector sleeved over the door-side wiring harness and having the second connector attached at one end thereof, the protector being at the other end slidably held inside the door; wherein the first connector is mounted on a door engagement inner wall of the car body, at a position between a door-side weather strip and a car body-side weather strip such that when the door is closed, the first and second connectors and the protector are completely concealed from a passenger compartment side.

Preferably, the door-side weather strip is located substantially at an intermediate width of a front end surface of the door, and the car body-side weather strip is located at a passenger compartment-side end of the door engagement inner wall.

Preferably, the first connector of the car body-side wiring harness includes a housing and a pair of pins provided upright on top and bottom walls of the housing, which pins serve as a pivot center of the protector.

According to another aspect of this invention, there is provided an assembly structure of an automotive door harness comprising: a car body; a door; a slide guide installed inside the door; a door-side wiring harness having a second connector couplable to a first, car body-side connector; a protector sleeved over the door-side wiring harness and having the second connector attached at one end thereof, the protector being at the other end slidably engaged with the slide guide, wherein the protector has a pair of slide pins vertically protruding at the said other end thereof, and the slide guide includes a guide groove for accommodating the protector therein and a pair of horizontal guide slots in communication with the guide groove for receiving the slide pins.

Preferably, the slide guide is fitted in a groove formed in a door inner panel of the door.

Preferably, the protector comprises a protector body substantially U-shaped in cross section and a cover separatably fitted to an open lateral side of the protector body, each having at a respective front end an enlarged portion for accommodating therein the second connector.

Preferably, the slide pins are provided on opposite walls of the protector body.

Preferably, the pair of horizontal guide slots are provided in a pair of upper and lower horizontal walls which vertically define the guide groove.

Preferably, the guide groove has a depth slightly larger than a thickness of the protector such that the protector is as a whole accommodated in the guide groove.

Preferably, the door inner panel is lined with a waterproof sheet and the slide guide is mounted in the door inner panel with the waterproof sheet interposed therebetween.

Preferably, the wiring harness led out from a rear end of the protector is fixed by a clamp at a position upward and rearward of the rear end of the protector.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

An embodiment of the present invention will be described in detail by referring to the accompanying drawings.

Figure 1:
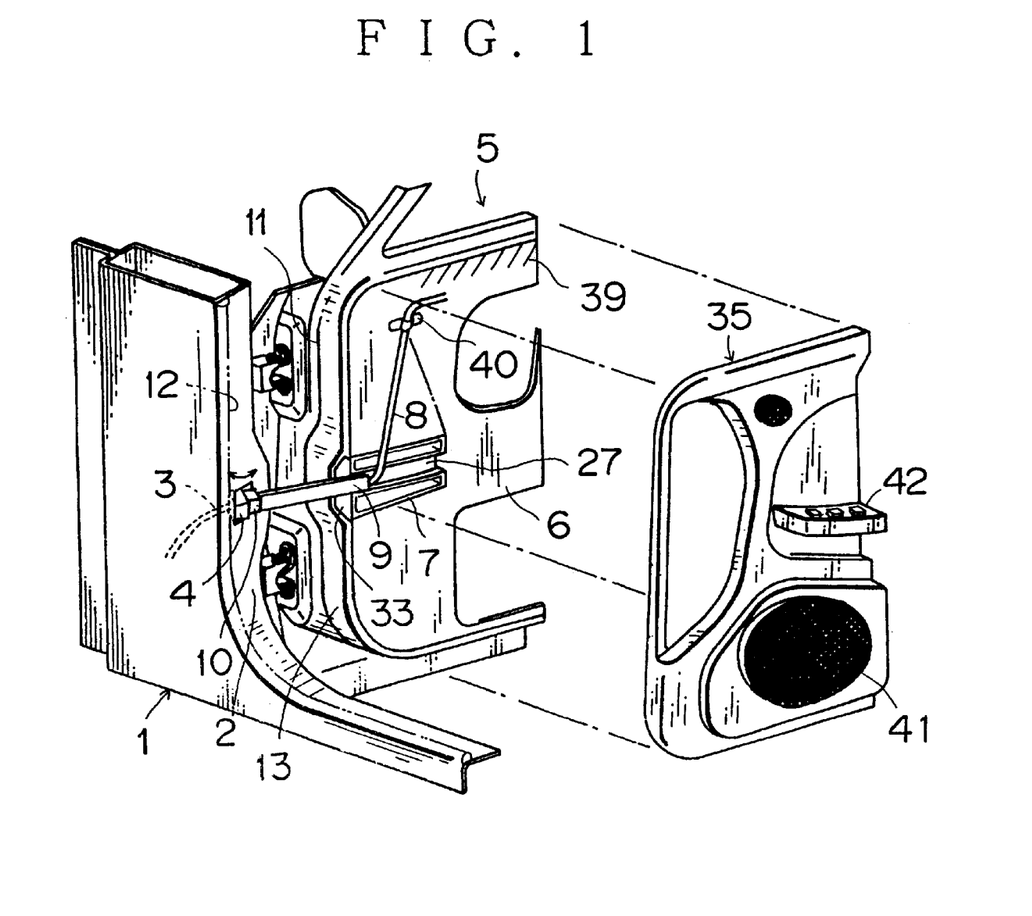
FIG. 1 is an exploded, perspective view of an assembly structure of an automotive door harness as one embodiment of this invention.

FIG. 1 shows one embodiment of an automotive door harness assembly structure of this invention.

This structure has a connector 4 of a car body-side wiring harness 3 installed rotatable on the door engagement inner wall (pillar inner panel) 2 of the car body 1. A horizontal slide guide 7 is mounted on a door inner panel 6 of the car door 5. A straight, rigid protector 9 made of synthetic resin is sleeved over a door-side wiring harness (door harness) 8, with one end of the protector 9 coupled to a connector 10 of the door-side wiring harness 8 (FIG. 2) and the other end slidably engaged in the slide guide 7. The door-side connector 10 is connected to the car body-side connector 4.

The car body-side connector 4 on the door engagement inner wall 2 of the car body 1 is installed between a door-side weather strip 11 and a car body-side weather strip 12. The coupled connectors 4, 10 are waterproofed by the door-side weather strip 11.

The door-side weather strip 11 is located almost at the center of a front end face 13 of the door 5 on the hinge mounting side, and the car body-side weather strip 12 is provided at the passenger compartment-side end of the door engagement inner wall 2., Both of these connectors 4, 10 in the coupled state are located between the weather strips 11 and 12. This structure eliminates the need for a conventional waterproofing grommet. Compared to the structure where the connectors 4, 10 are situated on the passenger compartment side of the car body-side weather strip 12, the structure of this embodiment has the protector 9 situated closer to the door (nearer the outside) and has a significantly improved appearance particularly when the door is opened.

In a structure where the connectors 4, 10 are located on the passenger compartment side of the weather strip 12, too, the connectors 4, 10 are normally concealed by an inner panel side. The inner panel side, however, needs to have an escape space for the connectors. The structure in which the connectors 4, 10 are arranged on the passenger compartment side of the weather strip 12 is already proposed in a separate patent application. The door engagement inner wall 2 usually has a door check arm (not shown) piercing therethrough, which is a mechanism to open the door in two steps. In this embodiment, the wiring harness path is arranged close to the door check arm. In FIG. 1, the slide guide 7 may be provided on the protector 9 side, not on the door side.

Figure 2:
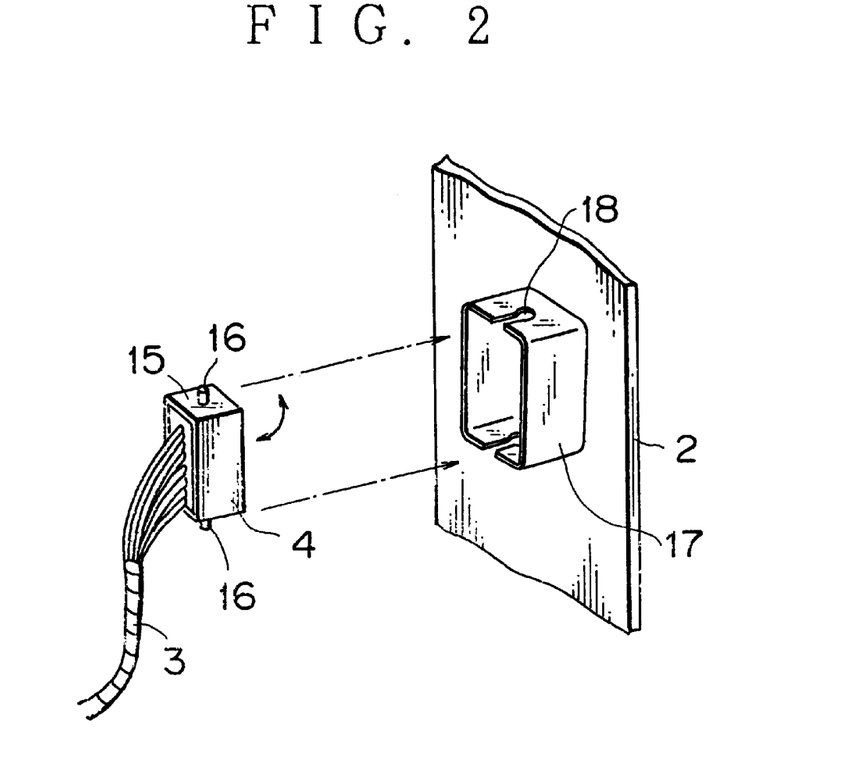
FIG. 2 is an exploded perspective view of a connector mounting structure on the car body side.
Figure 3:
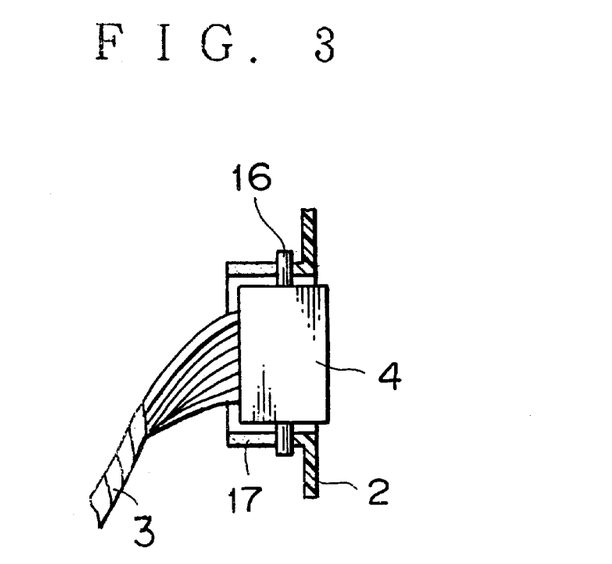
FIG. 3 is a vertical cross section of the connector mounting structure of FIG. 2.

FIG. 2 and FIG. 3 show an example structure for supporting the connector 4 on the car body 1.

This structure has a pair of pins 16 at the top and bottom walls 15 of the housing of the connector 4. On the door engagement inner wall 2 of the car body 1 is provided a frame wall 17 larger than the connector 4, which has a pair of notched holes 18 formed in the top and bottom wall thereof for engagement with the pins 16. The pins 16 work as a pivot center of the protector 9 to ensure a smooth pivotal motion of the protector 9 during the opening and closing of the door. The support structure for the connector will be proposed in a separate application.

Figure 4:
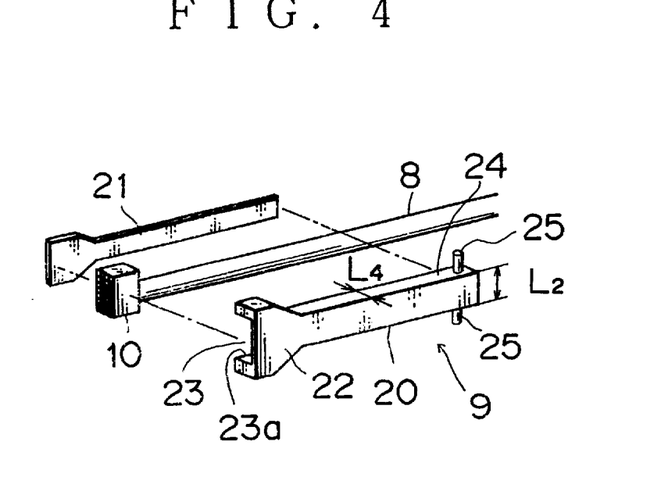
FIG. 4 is an exploded perspective view of a protector structure.

FIG. 4 shows the structure of the protector 9.

The protector 9 is divisible into two parts, a protector body 20 and a cover 21. The protector body 20 is roughly U-shaped in cross section (like a trough) and has at the front end portion an enlarged portion (connector engagement portion) 23 that engages the rear end portion of the connector 10. In a longitudinal groove 23 of the protector body 20 the wiring harness 8 can be inserted.

On the side walls 24 of the rear end portion of the protector body 20 (top and bottom walls when the protector body is assembled to the door), a pair of slide pins 25 protrude vertically. The slide pins 25 are formed into a short cylinder and slidably fit in guide slots 26 of the slide guide 7 (see FIG. 5). The slide pins 25 may be formed integral with the protector body 20 using a synthetic resin material or separately from the protector body 20 using a metal material.

The cover 21 is formed into a plate and fits in an opening 23a of the groove 23 of the protector body 20. The wiring harness 8 is held straight and prevented from bending by the rigid protector 9.

Figure 5:
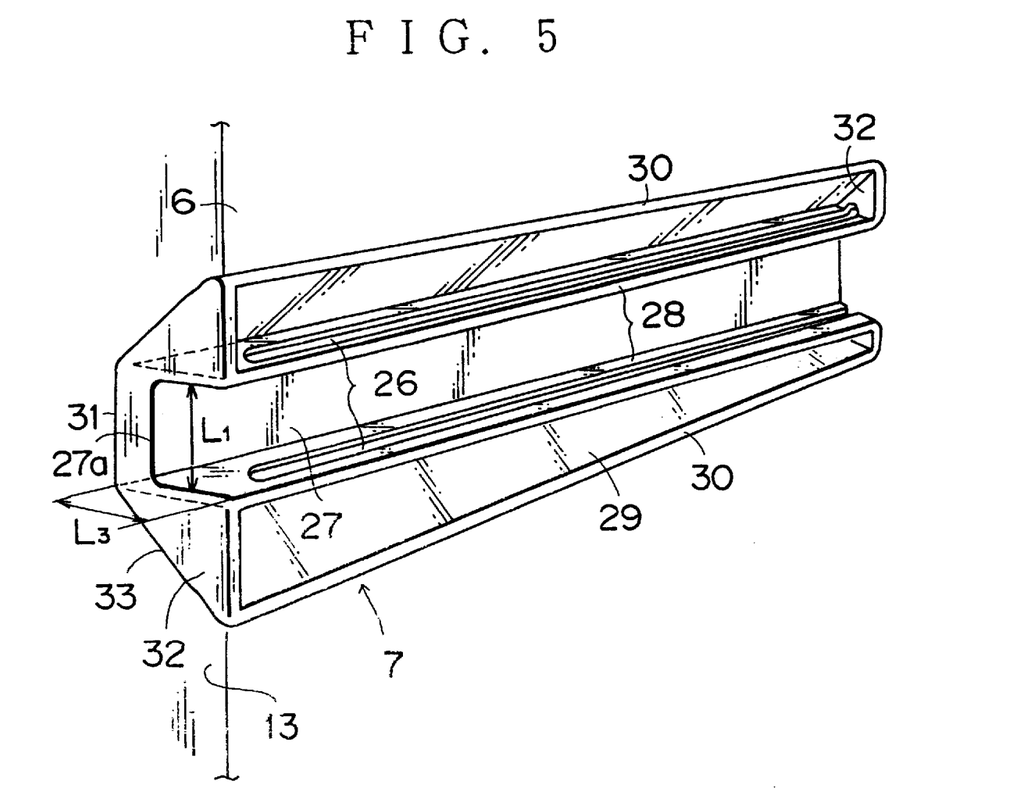
FIG. 5 is a perspective view of a slide guide structure.

FIG. 5 shows the structure of the slide guide 7.

The slide guide 7 has a guide groove 27, roughly U-shaped in cross section, which has longitudinally extending guide slots 26 formed in upper and lower horizontal walls 28 of the guide groove 27, with pin movement spaces 29 communicating with the guide slots 26 formed outside the horizontal walls 28.

The inner width L1 of the guide groove 27 is set slightly larger than the outer width L2 of the protector 9 (FIG. 4) and the depth L3 of the guide groove 27 is set slightly larger than the thickness L4 of the protector 9 so that the protector 9 can be accommodated in the guide groove 27. The protector 9 is slidable along the inner surface of the upper and lower horizontal walls 28 of the slide guide 7. The slide pins 25 of the protector 9, which are inserted into the guide slots 26 and project into the pin movement spaces 29, can slide along the guide slots 26. The slide pins 25 can be inserted into the guide slots 26 by tilting the protector 9 or they may first be inserted into the guide slots 26 before being screwed into the protector body 20.

On the outside of the upper and lower pin movement spaces 29 is formed a tapered outer wall 30, which in cross section expands from the bottom wall 31 of the guide groove 27. The slide guide 7 has at the front and rear ends end walls 32 having an opening 27a of the guide groove 27. The end walls 32 join the horizontal walls 28, the tapered outer wall 30 and the bottom wall 31.

The slide guide 7, as shown in FIG. 5 or 1, is securely fitted in a groove 33 formed in the door inner panel 6 which is tapered in cross section. As the door 5 is opened or closed, the protector 9 moves sliding in the slide guide 7. Because the guide groove 27 of the slide guide 7 is recessed from the surface of the door inner panel 6, the protector 9 is disposed almost flush with the door inner panel 6.

Figure 6:
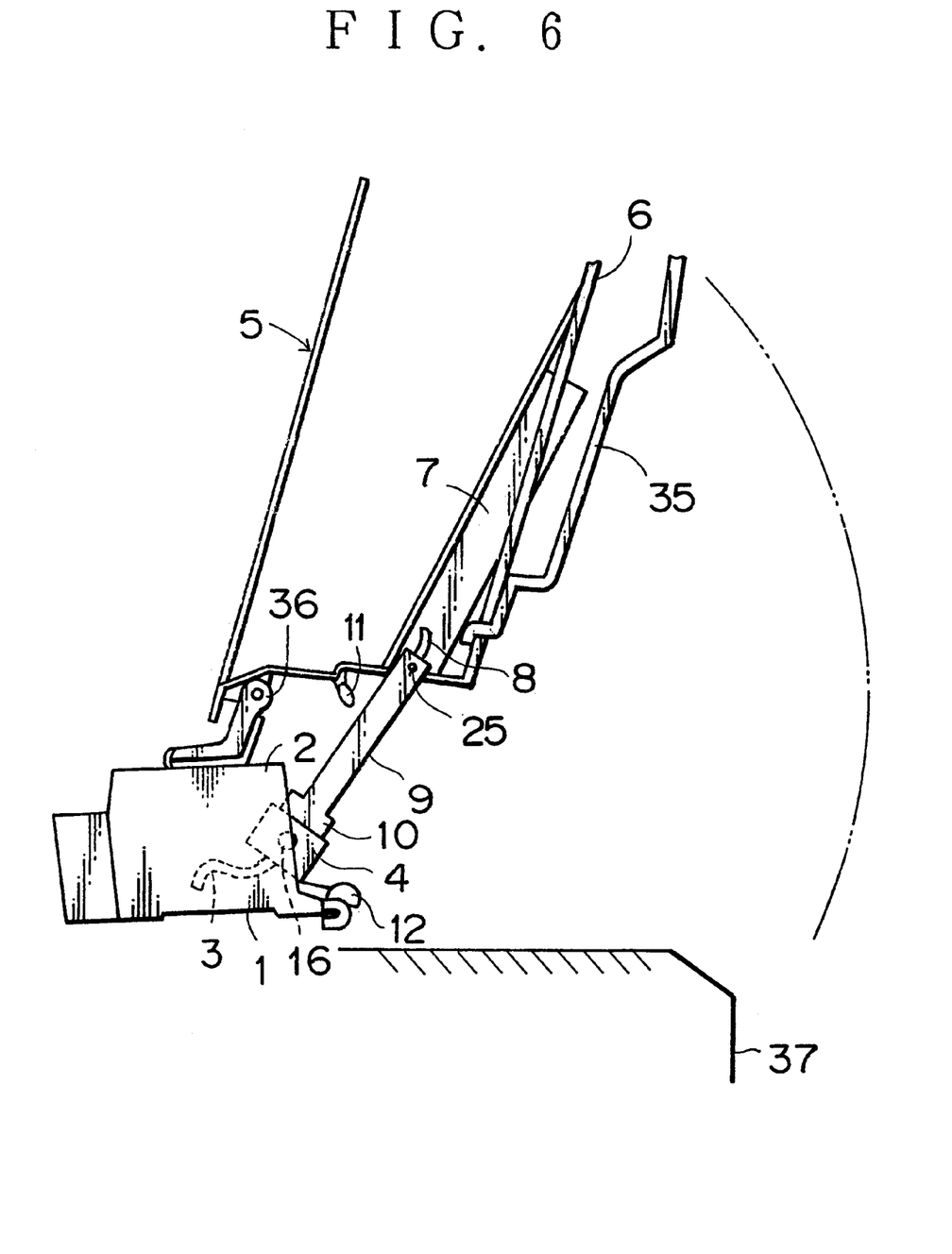
FIG. 6 is a plan view of the protector when the door is open.
Figure 7:
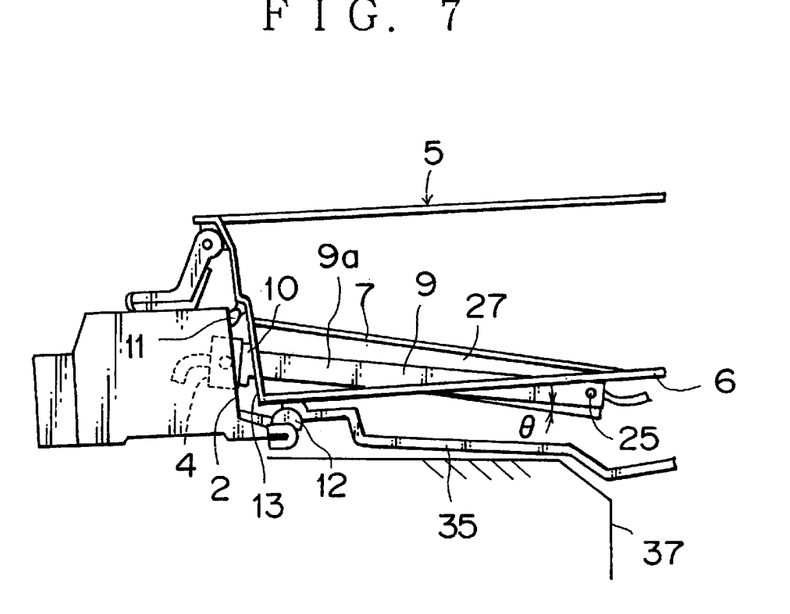
FIG. 7 is a plan view of the protector when the door is closed.

FIG. 6 and 7 show the protector 9 when the door is opened and closed.

In FIG. 6 showing the door in the open state, the protector 9 protrudes from the door engagement inner wall (pillar inner panel portion) 2 of the car body 1 and extends along the door inner panel 6. The slide pins 25 at the rear end of the protector 9 are situated at the front end of the slide guide 7, i.e., at the front end of the door 5.

Because the car body-side connector 4 is installed almost at the center of the door engagement inner wall, the protector 9 is shorter than when the car body-side connector 4 is located closer to the passenger compartment side. This structure has the advantage that the protector 9 does not protrude toward the passenger compartment side and remains inconspicuous, providing a good appearance. In FIG. 6, designated 11 is a weather strip on the door side, 12 a weather strip on the car body side, 36 a hinge fulcrum, and 37 an instrument panel.

As the door 5 is closed, the protector 9 rotates about a pin 16 of the car body-side connector 4 until it is completely received inside the door 5 as shown in FIG. 7. The protector 9 is almost completely accommodated in the guide groove 27 of the slide guide 7 and cannot be seen at all from the passenger compartment side. Because the both connectors 4, 10 are situated at the center of the door engagement inner wall 2, the closed door 5 completely conceals the connectors 4, 10 between the door front end face 13 and the door engagement inner wall 2. Thus, the front half portion 9a of the protector 9 is also hidden from the passenger compartment side. The slide pins 25 are situated at the rear end of the slide guide 7.

Because the pair of vertical slide pins 25 fit in the horizontal guide slots 26 (FIG. 5), the protector smoothly oscillates horizontally as the door is opened or closed. The protector 9 also smoothly oscillates in the slide guide 7. This is required because the inclination angle θ (FIG. 7) of the protector 9 with respect to the slide guide 7 differs between the state of FIG. 6 when the door is open and the state of FIG. 7 when the door is closed. When the door is closed, the protector 9 is almost completely received in the slide guide 7.

Because the connectors 4, 10 and the protector 9 do not protrude toward the passenger compartment side (instrument panel 37 side) when the door is closed, there is no need to bulge the door trim 35 to form a protector receiving portion. Hence, the shape of the door trim 35 becomes slim offering improved appearance (see the door trim 35 of FIG. 1). The connectors 4, 10, as shown in FIG. 7, are located between the door-side weather strip 11 and the car body-side weather strip 12 and reliably waterproofed by the door-side weather strip 11.

Further, because the surface of the door inner panel 6 is lined with a waterproof sheet 39 and the slide guide 7 and the protector 9 are arranged on the waterproof sheet 39 as shown in FIG. 1, the waterproofing of the protector 9 is complete.

In FIG. 1, the wiring harness 8 lead out from an opening at the rear end of the protector 9 is drawn inclined rearwardly upwardly to the upper part of the door inner panel 6 where it is supported by a clip 40 so that the wiring harness can oscillate as the protector 9 slides. This arrangement prevents loosening of the wiring harness 8 when the door is opened or closed. The door trim 35 is formed almost flat with no bulged protector accommodating portion. The door trim 35 is provided integrally with a speaker 41 and a switch unit 42.

While in the above embodiment the slide guide 7 is secured to the door inner panel 6, the slide guide 7 may be fixed to the back side of the door trim 35. In that case, too, the connectors 4, 10 are installed on the door engagement inner wall 2 of the car body 1. If the slide guide 7 is mounted to the door trim 35, the connectors 4, 10 and the front half 9a of the protector on the connector side do not protrude toward the passenger compartment side as they do not in the structure of FIG. 6 and 7, so that the door trim does not require the protector receiving portion.

The advantages of this invention may be summarized as follows.

Because on the door engagement inner wall of the car body (pillar inner panel portion) the connector on the protector side is coupled to the car body-side connector, the protector does not protrude toward the passenger compartment side and is completely concealed by the door when the door is closed, improving the appearance and enhancing the product value. Further, because the protector does not project toward the passenger compartment side, there is no need to bulge the door trim to form the protector receiving portion, which in turn reduces the cost of and improves the appearance of the door trim. Because the both connectors are situated between the door-side weather strip and the car body-side weather strip when the door is closed, the connectors can be reliably waterproofed eliminating the need for the grommet used in the conventional door harness assembly structure. This structure also eliminates the cumbersome work of inserting the wiring harness through holes, improving the assembly work efficiency.

Another advantage is that the vertical slide pins fitted in the horizontal guide grooves allow the protector to oscillate and slide smoothly and simultaneously as the door is closed and opened. Because the protector is received almost entirely in the slide guide when the door is closed and because the slide guide is fitted in the door inner panel, the protector does not protrude toward the door trim side, improving the appearance of and reducing the thickness of the door trim.

Having now fully described the invention, it will be apparent to one of ordinary skill in the art that many changes and modifications can be made thereto without departing from the spirit and scope of the invention as set forth herein.

What is claimed is:

1. An assembly structure of an automotive door harness comprising:

a car body;

a door;

a car body-side wiring harness having a first connector rotatably mounted on said car body;

a door-side wiring harness having a second connector couplable to said first connector of the car body-side wiring harness; and a protector sleeved over said door-side wiring harness and having said second connector attached at one end thereof, said protector being at the other end slidably held inside said door;

wherein said first connector is mounted on a door engagement inner wall of said car body, at a position between a door-side weather strip and a car body-side weather strip such that when the door is closed, said first and second connectors and said protector are completely concealed from a passenger compartment side.

2. An assembly structure of an automotive door harness according to claim 1, wherein said door-side weather strip is located substantially at an intermediate width of a front end surface of said door, and said car body-side weather strip is located at a passenger compartment-side end of said door engagement inner wall.

3. An assembly structure of an automotive door harness according to claim 1, wherein said first connector of the car body-side wiring harness includes a housing and a pair of pins provided upright on top and bottom walls of said housing, which pins serve as a pivot center of said protector.

4. An assembly structure of an automotive door harness comprising:

a car body;

a door;

a slide guide installed inside said door;

a door-side wiring harness having a second connector couplable to a first, car body-side connector;

a protector sleeved over said door-side wiring harness and having said second connector attached at one end thereof, said protector being at the other end slidably engaged with said slide guide, wherein said protector has a pair of slide pins vertically protruding at said the other end thereof, and said slide guide includes a guide groove for accommodating said protector therein and a pair of horizontal guide slots in communication with said guide groove for receiving said slide pins.

5. An assembly structure of an automotive door harness according to claim 4, wherein said slide guide is fitted in a groove formed in a door inner panel of said door.

6. An assembly structure of an automotive door harness according to claim 4, wherein said protector comprises a protector body substantially U-shaped in cross section and a cover separatably fitted to an open lateral side of said protector body, each having at a respective front end an enlarged portion for accommodating therein said second connector.

7. An assembly structure of an automotive door harness according to claim 6, wherein said slide pins are provided on opposite walls of said protector body.

8. An assembly structure of an automotive door harness according to claim 4, wherein said pair of horizontal guide slots are provided in a pair of upper and lower horizontal walls which vertically define said guide groove.

9. An assembly structure of an automotive door harness according to claim 4, wherein said guide groove has a depth slightly larger than a thickness of said protector such that said protector is as a whole accommodated in said guide groove.

10. An assembly structure of an automotive door harness according to claim 5, wherein said door inner panel is lined with a waterproof sheet and said slide guide is mounted in said door inner panel with said waterproof sheet interposed therebetween.

11. An assembly structure of an automotive door harness according to claim 4, wherein said wiring harness led out from a rear end of said protector is fixed by a clamp at a position upward and rearward of the rear end of said protector.

* * * * *